June 24, 1930.  L. H. KAUPKE  1,767,852
LISTER
Filed Aug. 1, 1924   4 Sheets-Sheet 1

Inventor:
Lee H. Kaupke
By Offield Mehlhope Scott & Poole
Attys

June 24, 1930.  L. H. KAUPKE  1,767,852
LISTER
Filed Aug. 1, 1924   4 Sheets-Sheet 2
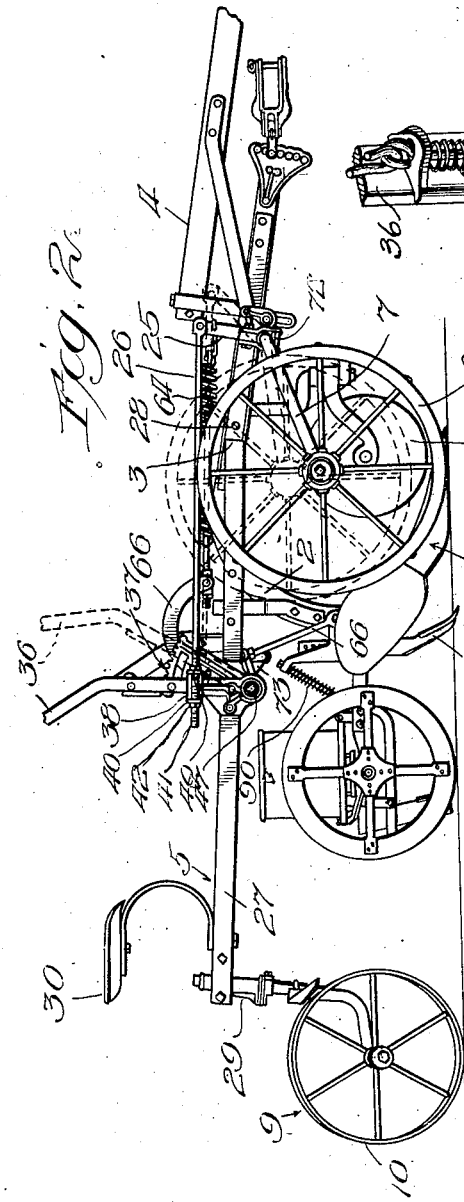
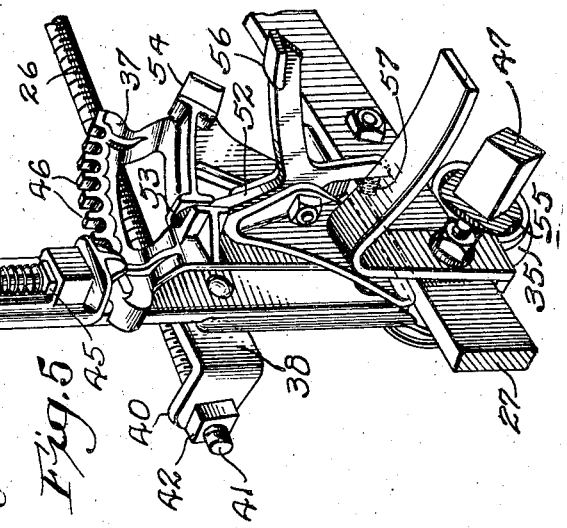
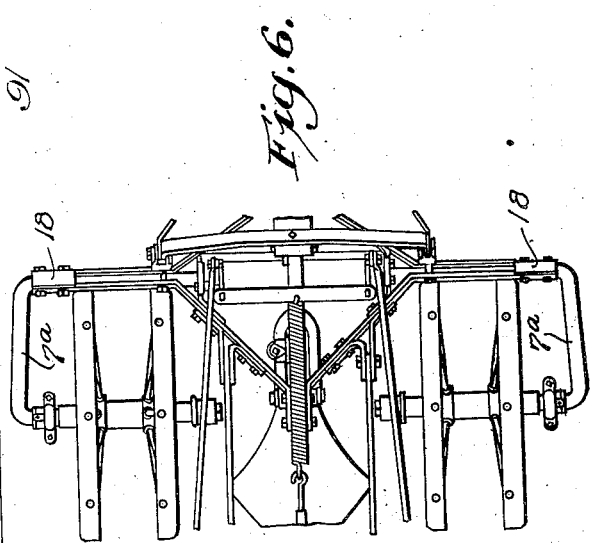
Inventor:
Lee H. Kaupke
By Offield Mehlhope Scott & Poole
Attys

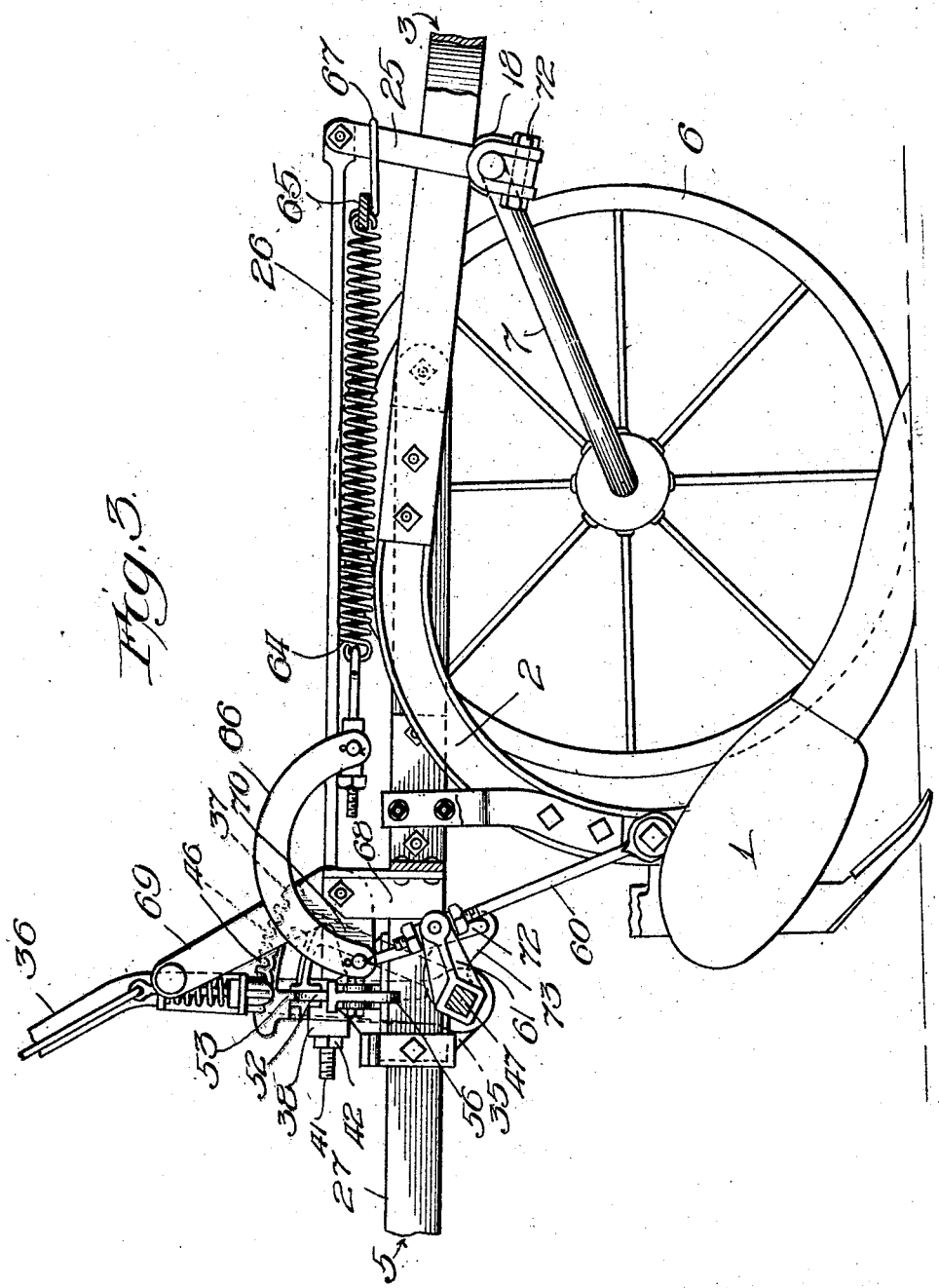

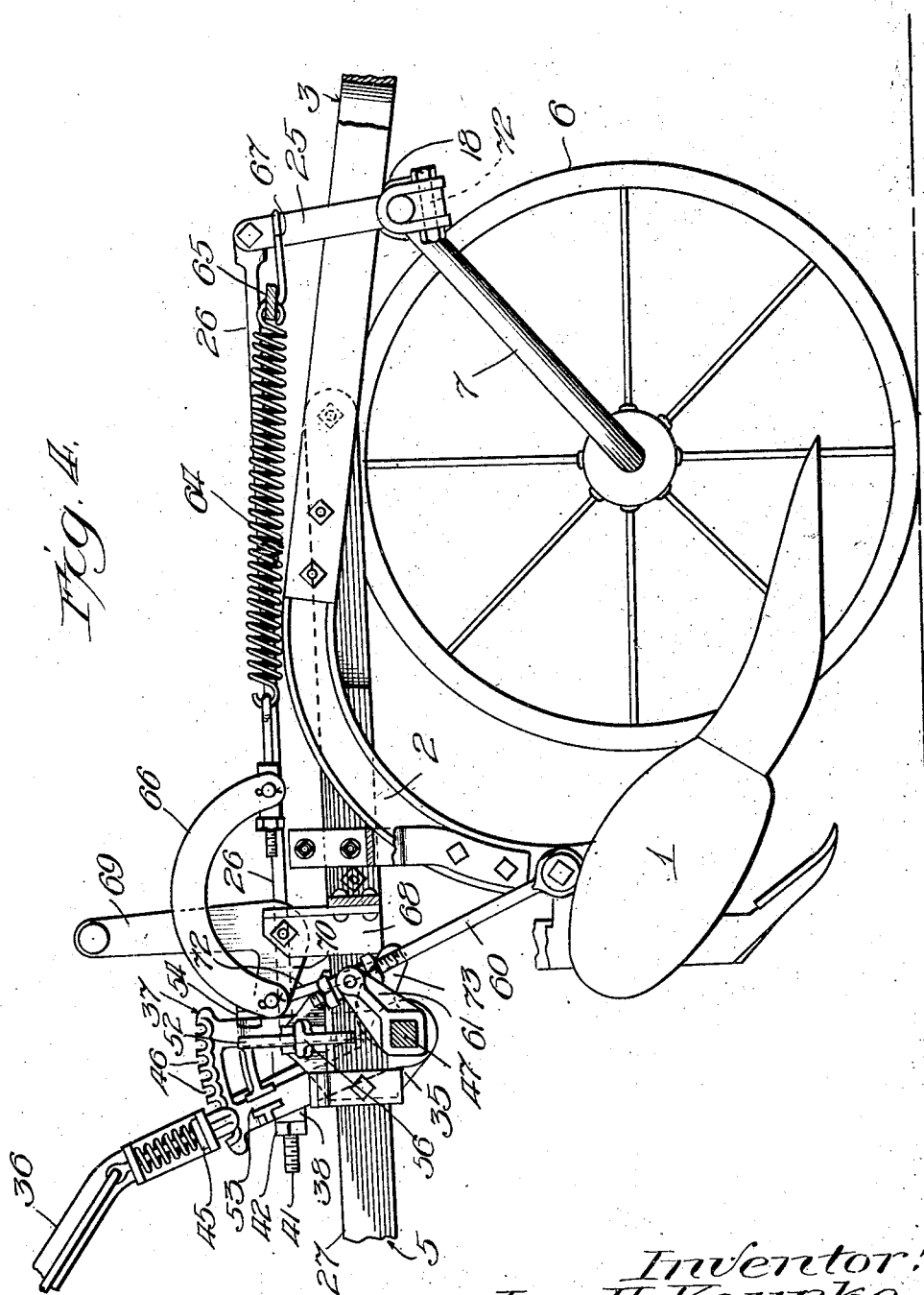

Patented June 24, 1930

1,767,852

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

LISTER

Application filed August 1, 1924. Serial No. 729,510.

This invention relates to listers and has for its principal object to provide a new and improved construction of devices of the character described.

More specifically, the invention relates to listers of the wide tread type which may be used in combination with an automatic planter.

Among the various features of novelty are the provision of a new and improved controlling mechanism for adjusting the depth of the plow bottom and new and improved construction of frame whereby the lister may be adapted for double listing with a narrow tread. Other features of the invention will appear from time to time as the description proceeds.

The invention may best be understood by reference to the accompanying drawings illustrating one preferred form in which my invention may be embodied.

In the drawings:

Figure 2 is a side view of the lister shown in Figure 1 showing the plow in lowered position with its bottom substantially level with both supporting wheels, and showing in dotted lines the relative position of one of the operating levers when its respective supporting wheel is raised, as for instance when operating over unplowed ground.

Figure 3 is an enlarged longitudinal section of the lister, and showing the lever mechanism in the same position as in Figure 2.

Figure 4 is a view similar to Figure 3, but showing the lever mechanism shifted to raise the frame and plow from the ground.

Figure 5 is an enlarged detail in perspective of one of the operating lever segments and its locking means.

Figure 6 is a fragmentary view illustrating the method and means for converting the lister into a narrow tread device for double, or re-listing.

Figure 1:
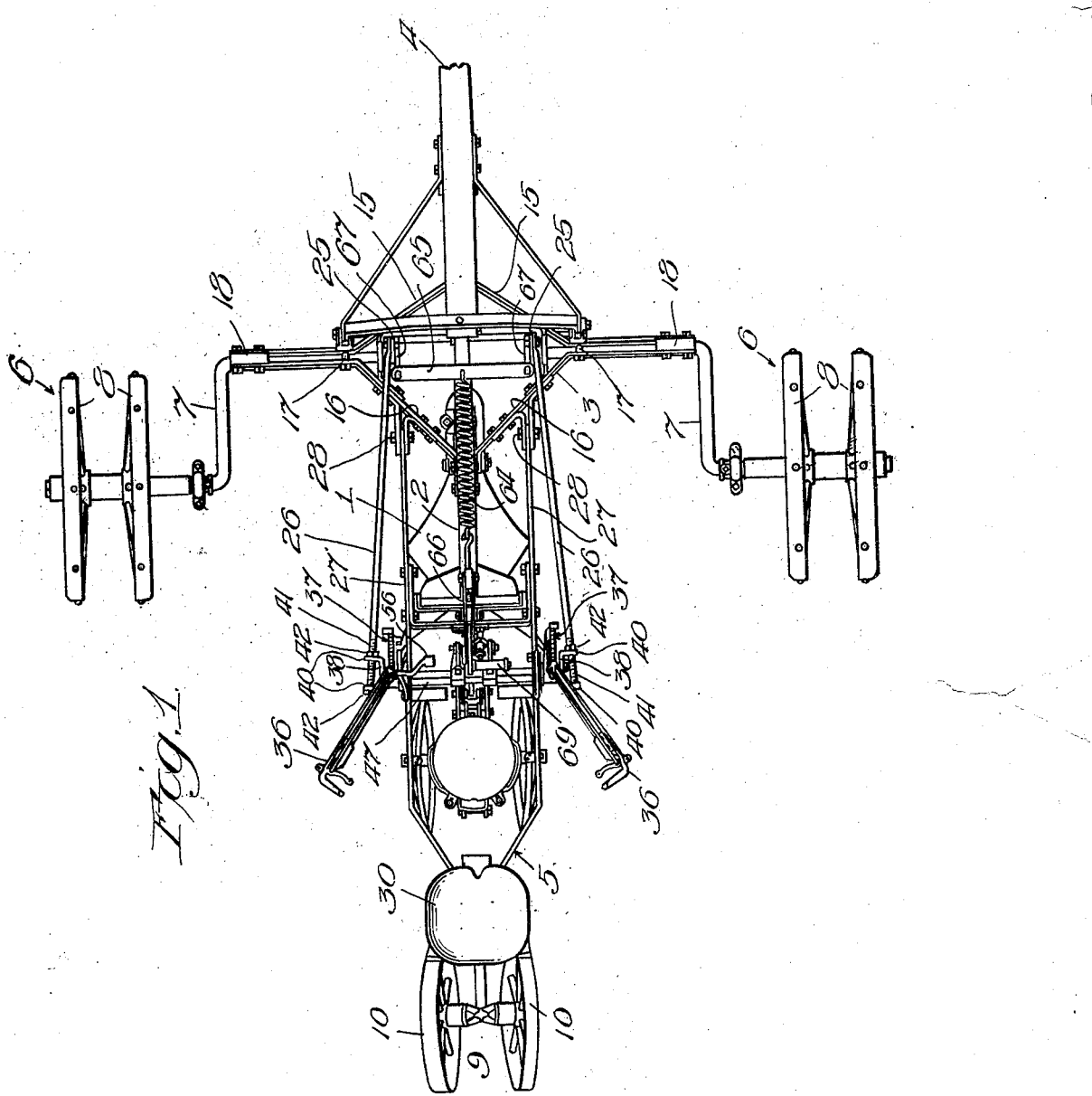
Figure 1 is a plan view of a lister constructed in accordance with my invention.

Referring to details of the drawings, a lister therein illustrated, has as its main elements, a plow or share 1, a plow beam 2, a main frame 3, having a tongue 4 thereon and a rear or sub frame 5. The lister is supported on a pair of widely spaced supporting wheels 6, 6 mounted on independent crank axles 7, 7, supported in opposite sides of the main frame 3 at the forward end of the device. As herein shown the lister wheels are of the usual double type, each comprising a pair of wheel elements 8, 8 spaced in parallel relation and especially adapted to form a guide in adjacent furrows as will hereinafter be more fully described.

A caster wheel 9 is pivotally mounted at the rear end of the sub frame and may be of any suitable form, as for instance, it may consist of a pair of wheel elements 10, 10, converging towards each other at their bottom for following in the furrow in the usual manner.

The share 1 is rigidly mounted on the beam 2 extending upwardly and forwardly to a suitable clevis 12 of usual form adapted for attachment to the draft beam. The beam is rigidly secured intermediate its ends to the main frame 3. Said frame comprises a frame-work extending toward opposite sides of the machine in which the crank axles 7, 7 of the front supporting wheels are mounted. In the form shown, this frame comprises a pair of front frame members 15, 15 and rear frame members 16, 16 having their inner ends connected in spaced relation on the beam and converging outwardly to an intermediate point, where said front and rear members are connected together as indicated at 17, from whence they extend in parallel relation to form a supporting member for their respective crank axle 7, the latter being connected thereto by suitable means such as bearings 18, 18. The crank axles are of the usual form and normally are inclined rearwardly from their bearings, the arrangement being such that the frame 3 is raised or lowered with respect to the ground by pivotal movement of the crank axles. In the form shown in Figure 1 the wheels 6 are mounted on the outside of the inclined portions of the wheel axles, and beyond the ends of the wheel frame 3, thus giving a relatively wide tread for ordinary listing operations.

The sub-frame 5 is pivotally connected on a transverse axis to the main frame 3. As shown herein this pivotal connection is made through a pair of frame members 27, 27 pivotally connected in spaced relation at their forward ends to the frame member 16, 16 of the front or main frame 3, as indicated at 28, 28 and converging toward their rear ends as indicated, where they are connected to a bracket 29, forming a journal for the rear caster wheel 9. The seat 30 is by preference also mounted on this bracket.

The lifting and lowering of the machine may be controlled by independent movement or either of the crank axles or by simultaneous movement thereof as desired. Independent movement is particularly desirable in wide tread listing, inasmuch as one of the wheels is used as a guide in an adjacent furrow while the other wheel moves on the unplowed ground at a level higher than the share bottom. It is also desirable to provide simultaneous movement of the wheels for lifting the share out of the ground either when turned at the end of a furrow or for transporting the machine from place to place. In the present invention, I provide a following controlling mechanism for the various movements just described. Each of the crank axles 7 are provided with a crank arm 25 preferably at its inner end. This crank arm is connected by a rod or link 26 to a lever mechanism mounted on the adjacent side member 27 of the seat frame 5.

Each of the hand lever mechanisms comprises a bracket 35 mounted on a sub-frame member 27 and providing bearing for an outer lever 36 and an inner segment 37 independent of said lever. The connecting link 26 is pivotally mounted on the lever, preferably by means of an adjustable connection, which in the form shown comprises a bracket 38 having a pair of outwardly extending flanges 40, 40 through which the threaded end 41 of the connecting link 26 extends. A pair of nuts 42, 42 are threaded on opposite sides of these flanges to afford the necessary longitudinal adjustment of the connecting rod in the bracket. Each lever is provided with a hand operated latch 45 of the usual form adapted for engagement in a series of notches 46, 46 on the adjacent segment 37. The two segments on opposite sides of the frame are operatively connected to be moved together by means of a transverse shaft 47 squared at its ends and passing through squared holes 50, 50 in the axial centers of said segments. Means are provided for locking the shaft and segments in two positions respective to the seat frame comprising a latch 52 pivotally mounted on one of the frame members 27 adjacent one of the segments and adapted to engage in one or the other of two notches 53, 54 at opposite ends of said segment. This latch may be operated by any suitable manner as for instance, by a foot lever 56 integral therewith and extending laterally in position to be readily manipulated, and provided with a spring 57 tending to maintain said latch in an engagement with the desired notch in the segment. By means of this arrangement, it will be observed that the swinging movement of each crank axle may be controlled independently of the other by movement of its respective lever along the adjacent segment 37. For instance, in Figures 2 and 5 both gear segments are shifted forwardly with the latch 52 in the rearmost notch 53. The levers 36, 36 are both in the rear most notches of the segment. In this position, both of the wheels rest substantially on the same level as the share bottom as shown in full lines in Figure 2. While flat listing however, only one of the wheels would be substantially on the same level as the share bottom, while the other wheel would be raised upon the unplowed ground. In order to raise one of the wheels, therefore, the respective hand lever 36 is pushed forward and adjusted to the desired notch on its segment, thus actuating the crank axle by rocking it forwardly through its respective connecting link 26 and crank arm 25, as shown in dotted lines in Figure 2. Very close adjustment of the level the share bottom relative to this wheel may be provided by means of the separate notches of the segments and further adjustment may be provided as desired by adjusting the connecting link 26 in its threaded engagement with respect to the bracket 38.

When it is desired to depress the wheels so as to lift the share from the ground, as for instance, when transporting the machine from place to place, or at the end of a furrow, both axles may be depressed simultaneously by depressing the foot lever 56 thus unlocking the segments from their rigid connection with the sub-frame so as to permit both segments and their connecting shaft 47 to be rocked rearwardly by either one or both of the hand levers, in which it will be seen that the share bottom is raised from the ground. The segments may be again locked in their rearmost position by means of the latch 52.

In order to maintain the share bottom in the desired angular relation to the ground at all times, I provide a controlling connection between the sub-frame 5 and the rear end of the beam. This connection comprises a connecting link 60 secured at one end to the beam 2 just above the share, and at the other end to an arm 61 extending forwardly of the transverse shaft 47. This connection provides a positive lift for the beam and share relative to the sub-frame and thereby assures the desired angular relation of the share to the ground and furthermore, controls the angular relation of main frame 3 and sub-frame 5 in all permissible positions thereof.

In order to assist in the lifting action of the lever devices above described, I provide a tension spring 64 connected at its forward end to an equalizer bar 65 and at its rearward end with an arched bar 66. The equalizer bar is connected at its ends by links 67, 67 to the crank arms 25, 25 of the crank axles. As will be seen in Figure 1, this spring is mounted centrally of the frame. The arch bar 66 extends over a bracket 68 on which a foot lever 69 is mounted, said foot lever having a rearwardly extending arm 70 at an angle thereto pivotally connected to the rear end of said arch member. This arch member is also pivotally connected at its rearward end to a transverse shaft 47 by means of a link 72 and a lever arm 73, the latter extending forwardly from said transverse shaft.

Said arch bar 66, foot lever 69 and lever arm 70 thus form in effect a toggle device affording operative connection between the spring 64 and the controlling connections with the rear end of the plow beam. Furthermore, the toggle device is operably connected with the lifting levers 36, 36, and their segments 37, 37 so that when said segments are swung forwardly as shown in Figures 2 and 3 the rear end of the foot lever arm 70 is swung downwardly beyond a dead center line passing through the pivotal connection of the foot lever 69 and the forward point of connection of the spring 64 to the equalizer bar 65. The toggle device is then locked, but the spring is under tension through the equalizer bar and acting upon both of the crank axles through the equalizer bar connections and is thus assisting in supporting the load on the wheels. The hand levers 36, 36 may thus be easily manipulated to control the height of either of the wheels as desired. When it is desired to lift the share, that is, to depress the wheels, this may be accomplished after the segments are unlocked by simultaneously pressing forwardly on the foot lever and rearwardly on the hand levers thus unlocking the toggle and rocking the transverse shaft and segments rearwardly into position shown in Figure 4. The spring 64 assists in this movement by reason of its connection with the crank axles through the arch bar 66, link member 72 and lifting arm 73 mounted on said shaft.

The automatic seeding device following the share may be of any suitable design and need not be described as it forms no part of the present invention. As shown herein, it is connected to the beam under suitable tension device 90 of the usual form. A subsoiler 91 is also provided as well as a coulter 92 although these may be omitted.

Means are also provided for changing from a wide tread to a narrow tread whereby the wheels may be used to guide the plow during double listing or re-listing. It will be understood that it is sometimes necessary to re-plant certain areas, as for instance, when such area is partially washed out by heavy rains. Under these conditions the area is again planted but preferably the plows are guided along the crest of the ridges rather than in the furrows made in the previous listing operation. Various guide means have heretofore been provided for double or re-listing as for instance, by provision of guide runners carried by the frame. In the present invention, it will be observed that the wheel frame 3, has laterally extending arms carrying bearings 18, 18 for the crank axles 7, 7. These bearings may be of any suitable form to permit the crank axles to be readily detached. In the form shown they comprise an upper journal member 70 and a removable lower member 71, secured by a pin 72 passing through both journal members as shown in Figure 2. The arrangement of said frame is such that crank axles 7ª, 7ª may be substituted for the crank axles 7, 7 the wheel bearing spindles of which are reversed and extend inwardly so that the wheels 6, 6 thereon are between the lateral boundary of the wheel frame 3 and the rear seat frame 5. These crank axles 7ª, 7ª may therefore be supplied as a part of the apparatus and substituted for the outwardly extending crank arm 7, 7 shown in Figure 6 whenever it is desired to provide a narrower tread lister of proper width to permit the wheels to follow in adjacent furrows and guide the plow along the crest of the previously formed ridge. I regard it as novel to provide a wide tread lister which can be thus converted in the manner just described.

It will be seen from the drawings, that when the wheels are set for wide tread listing, as shown in Figure 1, each of the wheels are spaced from the center of the plow a distance equal to the desired distance between the adjacent furrows at opposite sides of the plow, and therefore the wheels are spaced apart the distance of three furrows. When arranged for narrow tread listing, in the form shown in Figure 6, however, it will be understood from the foregoing description that the wheels are intended to follow adjacent rows previously formed by the same machine so that in the instance of re- or doube listing, the wheels must follow adjacent rows in order to permit the plow to follow the ridge formed in the previous operation. Consequently, in my improved invention I construct the frame structure between the wheels sufficiently narrow to permit the wheels when turned inwardly, as shown in Figure 6, to be spaced apart from the plow one-half the distance between the wheels and the plow when arranged for wide tread listing, as shown in Figure 1.

It will be understood further that the same proportions apply to different widths of rows which may vary somewhat, depending upon the preference of the operator. In some instances the farmers prefer to form the rows 3′ 6″ apart, while in other instances a 3′ standard is used, but in all instances the relisting must necessarily be done at half the distance of the original listing operation.

While I have illustrated and described one particular embodiment of my invention, it will be understood that I do not wish to be limited to the exact construction shown and described, but that various changes and modifications may be made without departing from the spirit and scope of my invention.

I claim:

1. In a lister, the combination of a main frame, a plow and beam carried by said frame, a sub-frame extending rearwardly from said main frame and pivotally connected thereto on a transverse axis, crank axles having supporting wheels mounted on said main frame and lever means mounted on said sub-frame operatively connected with said crank axles for raising or depressing them with respect to the plow.

2. In a lister, the combination of a main frame, a plow and beam carried by said frame, a sub-frame extending rearwardly from said main frame and pivotally connected thereon on a transverse axis, crank axles having supporting wheels mounted on said main frame, lever means mounted on said sub-frame operatively connected with said crank axles for raising or depressing them with respect to the plow, and a controlling connection between said plow and said sub-frame and operable with said lever means to raise said plow when said crank axles are depressed.

3. In a lister, the combination of a frame having a pair of crank axles and supporting wheels mounted on opposite sides thereof, a plow carried by said frame, lever arms on said crank axles, a pair of hand levers pivoted on said frame and linked to said lever arms, a pair of segments having operative connection with each other and each mounted concentric with one of said hand levers, locking means affording independent adjustment of said hand levers on their respective segments, and other locking means affording adjustment of said segments in a plurality of positions respective to said frame.

4. In a lister, the combination of a frame having a pair of crank axles and supporting wheels mounted on opposite sides thereof, a plow carried by said frame, lever arms on said crank axles, a shaft mounted transversely of said frame, segments fixed on opposite ends of said shaft, hand levers pivotally mounted concentric with each of said segments and linked to said lever arms, locking means affording independent adjustment of said hand levers on their respective segments, and other locking means affording rotatable adjustment of said shaft and segments relative to said frame.

5. In a lister, the combination of a frame having a pair of crank axles and supporting wheels mounted on opposite sides thereof, a plow carried by said frame, lever arms on said crank axles, a sub-frame, a pair of hand levers pivoted on said sub-frame and linked to said lever arms, a pair of segments having operative connection with each other and each mounted concentric with one of said hand levers, locking means affording independent adjustment of said hand levers on their respective segments, other locking means affording adjustment of said segments in a plurality of positions respective to said frame and means connecting said segments with said plow operable to lift the same, when the supporting wheels and axles are depressed.

6. In a lister, the combination of a frame having a pair of crank axles and supporting wheels mounted on opposite sides thereof, a plow carried by said frame, lever arms on said crank axles, a sub-frame, a shaft mounted transversely of said sub-frame, segments fixed on opposite ends of said shaft, hand levers pivotally mounted concentric with each of said segments and linked to said lever arms, locking means affording independent adjustment of said hand levers on their respective segments, other locking means affording rotatable adjustment of said shaft and segments relative to said sub-frame, a lever arm rigid with said shaft, and a link connection with said plow operable to lift the latter when the shaft is rocked to depress the supporting wheels and axles.

7. In a lister, the combination of a plow having a beam, a main frame rigid with said beam, crank axles having supporting wheels carried by said frame, a sub-frame provided with a caster wheel, said sub-frame pivoted rearwardly of said frame on a transverse axis, lever mechanism carried by said sub-frame operable to raise or depress said crank axles and wheels relative to said main frame, comprising a transverse shaft, a lever arm mounted on said shaft, and a link connecting said lever arm with said plow and operable to raise said plow when said crank axles and wheels are depressed.

8. In a lister, the combination of a main frame, a plow having a forwardly extending beam rigid with said frame, a pair of crank axles having supporting wheels mounted on opposite sides of said main frame, a sub-frame pivoted to and extending rearwardly from said main frame, lever arms on said crank axles, a pair of hand levers pivoted on said sub-frame and linked to said lever arms, a pair of segments having operative connection with each other, and each mounted concentric with one of said hand levers, locking means affording independent adjustment of said hand levers on their respective segments, other locking means affording adjustment of said segments in a plurality of positions respective to said sub-frames and means connecting said segments with said plow operable to lift the same relative to said sub-frame when the supporting wheels and axles are depressed.

9. In a lister, the combination of a main frame, a plow having a forwardly extending beam rigid with said frame, a pair of crank axles and supporting wheels mounted on opposite sides of said main frame, a sub-frame pivoted to and extending rearwardly from said main frame, lever arms on said crank axles, a shaft mounted transversely of said sub-frame, segments carried on opposite ends of said shaft, hand levers pivotally mounted concentric with each of said segments and linked to said lever arms, locking means affording independent adjustment of said hand levers on their respective segments, other locking means affording rotatable adjustment of said shaft and segments relative to said frame, and means connecting said shaft with said plow operable to lift the said plow relative to said sub-frame when the supporting wheels and axles are depressed.

10. In a lister, the combination of a main frame, a plow having a forwardly extending beam rigid with said frame, a pair of crank axles and supporting wheels mounted on opposite sides of said main frame, a sub-frame pivoted to and extending rearwardly from said main frame, lever arms on said crank axles, a shaft mounted transversely of said frame, segments carried on opposite ends of said shaft, hand levers pivotally mounted concentric with each of said segments and linked to said lever arms, locking means affording independent adjustment of said hand levers on their respective segments, other locking means affording rotatable adjustment of said shaft and segments relative to said frame, a lever arm on said shaft, and a link connection with said plow operable to lift the latter relative to said sub-frame when the shaft is rocked to depress the supporting wheels and axles.

11. In a lister, a frame, a pair of crank axles having supporting wheels operable for raising and lowering said frame relative to the ground, said crank axles each having lever arms and lever mechanism associated therewith for independent operation thereof, a tension spring connected centrally to, and extending longitudinally of said frame and a transverse equalizer bar connected centrally with said spring and at its ends with said lever arms of the crank axles.

12. In a lister, a frame, a pair of crank axles having supporting wheels operable for raising or lowering said frame relative to the ground, lever mechanism on said frame affording either simultaneous or independent actuation of said crank axles, lever arms on said crank axles, an equalizer bar connected between said lever arms and a tension spring connected centrally to and extending longitudinally of said frame and operably connected with said equalizer bar.

13. In a lister, a frame, a cultivator tool carried thereby, a pair of crank axles having supporting wheels and operable for raising and lowering said frame relative to the ground, said crank axles each having lever arms and lever mechanism associated therewith for independent operation thereof, and a tension spring extending longitudinally of said frame, a sub-frame, a transverse equalizer bar connected centrally with the forward end of said spring and at its ends with said lever arms of the crank axles, and means operably connecting the rear end of said spring with said plow cultivator tool including lever mechanism operable to transmit a lifting movement from said spring to said tool relative to said sub-frame.

14. In a lister, a main frame, a plow carried thereby, crank axles having supporting wheels mounted on said main frame, a sub-frame pivoted to said main frame on a transverse axis, spring means connected to said crank axles in position to assume a portion of the supported load thereon, lever means for actuating said crank axles to raise and lower said main frame relative to the ground and toggle means on said sub-frame forming operative connection between the rear end of said spring means and said plow and adapted in one position of said toggle means to transmit a lifting moment to said plow from said spring and in another position to lock said toggle means and render said lifting moment ineffectual.

15. In a lister, a main frame, a plow carried thereby, crank axles having supporting wheels mounted on said main frame, a sub-frame pivoted to said main frame on a transverse axis, spring means connected to said crank axles in position to assume a portion of the supported load thereon, lever means for actuating said crank axles to raise and lower said main frame relative to the ground and toggle means on said sub-frame forming operative connection between the rear end of said spring means and said plow and adapted to transmit a lifting moment to said plow from said spring, and a foot lever for actuating said toggle means.

16. In a lister, a main frame, a plow carried thereby, crank axles having supporting wheels mounted on said main frame, a sub-frame pivoted to said main frame on a transverse axis, spring means connected to said crank axles in position to assume a portion of the supported load thereon, lever means for actuating said crank axles to raise and lower said main frame relative to the ground, toggle means on said sub-frame forming operative connection between the rear end of said spring means and said plow and adapted in one position of said toggle means to transmit a lifting moment to said plow from said spring and in another position to lock said toggle means and render said lifting moment ineffectual, and a foot lever for actuating said toggle means.

17. In a lister, a main frame, a plow carried thereby, crank axles having supporting wheels mounted on said main frame, a sub-frame pivoted to said main frame on a transverse axis, spring means connected to said crank axles in position to assume a portion of the supported load thereon, hand lever means for actuating said crank axles to raise and lower said main frame relative to the ground, toggle means on said sub-frame forming operative connection between the rear end of said spring means and said plow and adapted to transmit a lifting moment to said plow from said spring, and a foot lever for actuating said toggle means, said hand lever means and toggle means being operatively connected together to coact in simultaneously depressing said crank axles and raising said plow relative to said sub frame.

18. In a lister, a main frame, a plow carried thereby, crank axles having supporting wheels mounted on said frame, a sub-frame pivoted to said main frame on a transverse axis, a single longitudinally extending spring having equalized connection with said crank axles in position to assume a portion of the supported load thereon, lever means for actuating said crank axles to raise and lower said main frame relative to the ground, toggle means on said sub-frame forming operative connection between the rear end of said spring means and said plow and adapted to transmit a lifting moment to said plow from said spring.

19. In a lister, a main frame, a plow carried thereby, crank axles having supporting wheels mounted on said main frame, a sub-frame pivoted to said main frame on a transverse axis, a single longitudinally extending spring having equalized connection with said crank axles in position to assume a portion of the supported load thereon, lever means for actuating said crank axles to raise and lower said main frame relative to the ground, and toggle means on said sub-frame forming operative connection between the rear end of said spring and said plow and adapted to transmit a lifting moment to said plow from said spring.

20. In a lister, a main frame carrying a plow, crank axles having supporting wheels mounted on said main frame, a sub-frame pivoted to said main frame on a transverse axis and provided with a caster wheel, a transverse shaft mounted on said sub-frame, segments mounted on opposite ends of said shaft, hand levers associated with said segments, locking means adjustably securing said shaft and segments in a plurality of positions relative to said sub-frame, means operatively connecting said hand levers with said crank axles to raise or depress the same relative to the main frame, a longitudinally extending spring having equalized connection at its forward end with said crank axles to assume a portion of the supported load, an arch bar connected with the rear of said spring, a foot lever connected to said arch bar and pivoted on the sub-frame, a link connecting said arch bar with a crank arm on said transverse shaft and another link connecting said plow with a crank arm on said shaft.

21. In a lister, a main frame, a sub-frame pivoted at the rear end thereof, crank axles and supporting wheels on said main frame, a plow and beam rigid with said main frame, and lever means connecting said sub-frame with said plow beam rearwardly of the point of pivotal connection of the main and sub-frames, said lever means also being operatively connected with said crank axles to maintain the plow bottom in a substantially uniform angular position relative to the ground in all permissible positions thereof.

22. In a lister, a main frame and a sub-frame pivotally connected on a transverse axis, a plow rigidly connected to said main frame and extending rearwardly beyond the point of pivotal connection of said main and sub-frames, crank axles on said main frame extending rearwardly, and having supporting wheels substantially opposite said plow bottom, and lever means connecting the rear end of said beam and said sub-frame and operatively connected with said crank axles to maintain said plow bottom in a substantially uniform angular position relative to the ground in all permissible positions of the main frame, sub-frame and crank axles.

Signed at Rock Island, Ill., this 14th day of June, 1924.

LEE H. KAUPKE.